(12) United States Patent
Uetake et al.

(10) Patent No.: US 9,233,479 B2
(45) Date of Patent: Jan. 12, 2016

(54) CUTTING JIG AND CUTTING APPARATUS FOR CUTTING PLATE MATERIAL WITH ROLLING BLADE WHILE HOLDING PLATE MATERIAL AT EACH SIDE OF ROLLING BLADE

(71) Applicant: NHK SPRING CO., LTD., Yokohama-shi, Kanagawa (JP)

(72) Inventors: Hiroyoshi Uetake, Kanagawa (JP); Akio Mashima, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 240 days.

(21) Appl. No.: 13/782,080

(22) Filed: Mar. 1, 2013

(65) Prior Publication Data
US 2013/0247733 A1    Sep. 26, 2013

(30) Foreign Application Priority Data
Mar. 22, 2012    (JP) .................................. 2012-066263

(51) Int. Cl.
| | |
|---|---|
| G11B 21/21 | (2006.01) |
| B26D 7/01 | (2006.01) |
| G11B 5/48 | (2006.01) |
| B26D 1/20 | (2006.01) |

(52) U.S. Cl.
CPC ................ B26D 7/01 (2013.01); G11B 5/4833 (2013.01); B26D 1/20 (2013.01); *Y10T 83/566* (2015.04)

(58) Field of Classification Search
CPC .......... B26D 1/20; B26D 7/01; G11B 5/4833; Y10T 83/566

USPC .......... 83/353, 483–485, 614, 455, 884–887; 30/292, 240, 265, 295, 306, 307, 319
See application file for complete search history.

(56) References Cited

U.S. PATENT DOCUMENTS

| | | | |
|---|---|---|---|
| 1,391,201 A | | 9/1921 | Mills |
| 1,940,976 A | * | 12/1933 | Simonton ........................ 30/292 |
| 1,961,425 A | | 6/1934 | Stine |
| 1,526,038 A | | 9/1970 | Katz |
| 4,020,550 A | * | 5/1977 | Okada ............................. 30/124 |
| 4,226,153 A | * | 10/1980 | Insolio ............................ 83/881 |
| 4,401,001 A | * | 8/1983 | Gerber et al. ................... 83/451 |
| 4,582,305 A | * | 4/1986 | Brothers ......................... 269/11 |
| 5,699,707 A | * | 12/1997 | Campbell, Jr. ................. 83/100 |
| 6,681,669 B1 | * | 1/2004 | Bogan ............................ 83/176 |

FOREIGN PATENT DOCUMENTS

| | | |
|---|---|---|
| JP | 35-11485 | 5/1960 |
| JP | 49-45180 | 7/1972 |
| JP | 7-31991 | 7/1995 |
| JP | 8-85096 | 4/1996 |
| JP | 2000-57723 | 2/2000 |
| JP | 2004-345074 | 12/2004 |

* cited by examiner

*Primary Examiner* — Stephen Choi
(74) *Attorney, Agent, or Firm* — Jordan and Hamburg LLP

(57) ABSTRACT

A cutting jig for cutting a plate material positioned on a supporting surface, includes a jig body, a rolling blade rotatably supported with the jig body to roll on and cut the plate material, and paired holding parts rotatably supported with the jig body at respective sides of the rolling blade in a direction along a rotation axis of the rolling blade to roll on and hold adjoining portions of a cut portion of the plate material, each adjoining portion on which a stress acts due to the rolling blade cutting the plate material at the cut portion.

12 Claims, 10 Drawing Sheets

CUTTING JIG AND CUTTING APPARATUS FOR CUTTING PLATE MATERIAL WITH ROLLING BLADE WHILE HOLDING PLATE MATERIAL AT EACH SIDE OF ROLLING BLADE

BACKGROUND OF THE INVENTION

1. Field of the Invention

The present invention relates to a cutting jig and a cutting apparatus for cutting a plate material used when, for example, manufacturing a head suspension of a disk drive incorporated in an information processing unit.

2. Description of Related Art

A disk drive has rotatable disks such as magnetic or optical disks and head suspensions each supporting a read/write element to read and write data on a corresponding disk.

The head suspension is generally made of plate-like parts such as a base plate, a load beam, and a flexure. The parts of the head suspension partly overlap each other and are joined together at the overlapped portions.

For such head suspension, Japanese Unexamined Patent Application Publication No. 2000-57723 discloses a manufacturing method in view of efficiency. According to this method, chain products are prepared for component parts of a head suspension in advance. Each chain product includes a plurality of the same parts that are chained together in a frame. Among the chain products, parts composing each head suspension are joined together to efficiently form a plurality of head suspensions that are chained together through the frames of the chain products. The chained head suspensions are cut from the frames into individual head suspensions.

In this method, chain sheets are preferably prepared for the chain products. Each chain sheet as a plate material includes a plurality of the same chain products that are chained together in a frame. From the chain sheet, individual chain products are cut with a die.

However, there are different types of head suspensions and parts for different disk drives that vary in shape and size, and therefore, a common die is not used among different types of head suspensions and parts.

In a case of a high-volume manufacturing, a special die is prepared fore given type of a head suspension. In a case of a low-volume manufacturing such as trial manufacture, however, it is hard to prepare such a special die considering the cost and the like.

In the low-volume manufacturing, individual chain products are cut from a chain sheet with scissors or a cutter blade. This deforms the individual chain products as well as chained parts thereof even if the cutting is carefully carried out. This deformation results in deteriorating a dynamic characteristics of a head suspension as a product.

SUMMARY OF THE INVENTION

An object of the present invention is to provide a cutting jig and cutting apparatus, capable of cutting a plate material without deformation with no use of a special die.

In order to accomplish the object, a first aspect of the present invention provides a cutting jig for cutting a plate material positioned on a supporting surface. The cutting jig includes a jig body, a rolling blade rotatably supported with the jig body to roll on and cut the plate material, and paired holding parts rotatably supported with the jig body at respective sides of the rolling blade in a direction along a rotation axis of the rolling blade. The holding parts roll on and hold adjoining portions of a cut portion of the plate material, each adjoining portion on which a stress acts due to the rolling blade cutting the plate material at the cut portion.

According to the first aspect of the present invention, the rolling blade cuts the plate material while the adjoining portions of the cut portion on which the stress acts due to the rolling blade are held by the holding parts at the both sides of the rolling blade in the direction along the rotation axis. This allows a plate material to be cut without deformation with no use of a special die.

DETAILED DESCRIPTION OF EMBODIMENTS

A cutting apparatus with a cutting jig according to embodiments of the present invention will be explained. Each embodiment realizes the cutting apparatus with the cutting jig capable of cutting a plate material without deformation with no use of a special die.

For this, the cutting jig of each embodiment includes a rolling blade that rolls on and cuts the plate material and paired holding parts that roll on and hold adjoining portions of a cut portion of the plate material, each adjoining portion on which a stress acts due to the rolling blade cutting the plate material at the cut portion.

Preferably, the cutting jig has a sub holding part that rolls on and holds the plate material in at least one side of the rolling blade in a rolling direction. More preferably, the holding part and the sub holding part are pushed toward the plate material by pushing members.

The cutting apparatus with the cutting jig may be used for cutting a thin plate such as a chain sheet in which a plurality of chain products are chained together so that individual chain products are cut from the chain sheet. Each chain product has a plurality of parts that are chained together for respective head suspensions.

Figure 1:
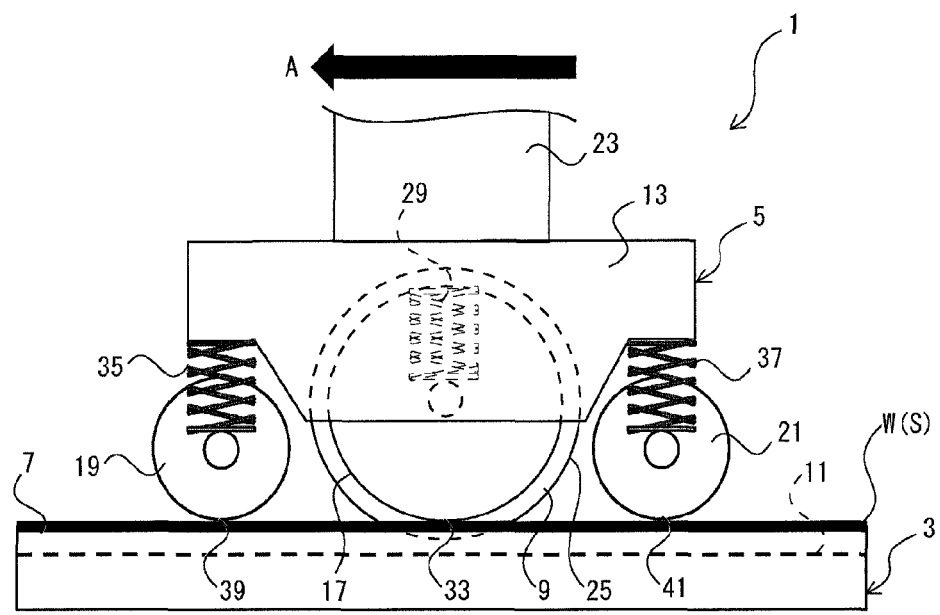
FIG. 1 is a schematic side view illustrating a main part of a cutting apparatus with a cutting jig according to a first embodiment of the present invention.
Figure 2:
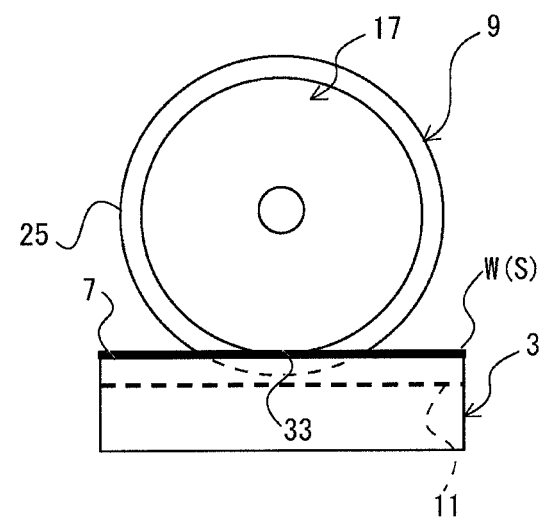
FIG. 2 is a schematic side view illustrating a rolling blade and a main holding roller of the cutting apparatus of FIG. 1.
Figure 3:
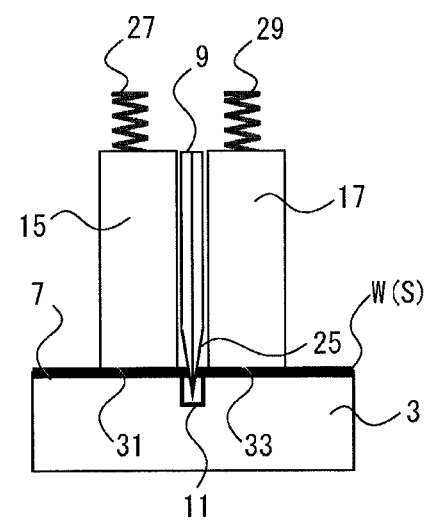
FIG. 3 is a schematic front view illustrating the rolling blade and the main holding rollers of the cutting apparatus of FIG. 1.
Figure 4:
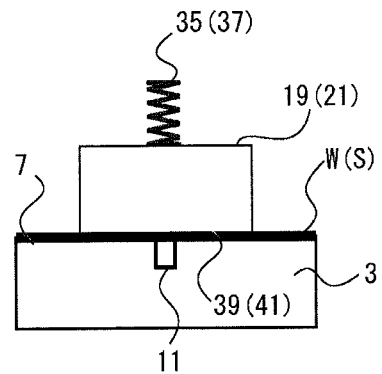
FIG. 4 is a schematic front view illustrating a sub holding roller of the cutting apparatus of FIG. 1.

First, a cutting apparatus of the first embodiment of the present invention will be generally explained with reference to FIGS. 1-4. FIG. 1 is a schematic side view illustrating a main part of the cutting apparatus 1 with the cutting jig 5, FIG. 2 is a schematic side view illustrating a rolling blade 9 and a main holding roller 17 (15) of the cutting apparatus 1 of FIG. 1, FIG. 3 is a schematic front view illustrating the same, and FIG. 4 is a schematic front view illustrating a sub holding roller 19 (21) of the cutting apparatus 1 of FIG. 1.

The cutting apparatus 1 according to the first embodiment has a stand or support 3 and the cutting jig 5 supported above the support 3 so as to be conveyed.

The support 3 includes a flat supporting surface 7 on which a plate material W is put or positioned. The support 3 has a recessed groove 11 that is formed on the supporting surface 7 and avoids the rolling blade 9 of the cutting jig 5 to cut the plate material W.

The cutting jig 5 includes a jig body 13, the rolling blade 9, paired main holding rollers 15 and 17 as paired holding parts, and paired sub holding rollers 19 and 21 as paired sub holding parts.

The jig body 13 is fixed at an end of an arm 23 (FIG. 1) and is conveyed by a conveyer (not illustrated) through the arm 23 along the groove 11 on the supporting surface 7. The jig body 13 supports the rolling blade 9 and the paired main holding rollers 15 and 17 at an intermediate part in a conveying direction of the jig body 13. At front and rear parts in the conveying direction, the jig body 13 supports the paired sub holding rollers 19 and 21, respectively.

The rolling blade 9 is a disk-shaped cutter rotatably supported with the jig body 13. The rolling blade 9 has a cutting edge 25 (peripheral cutting edge) with a wedge shape formed on an outer periphery of the rolling blade 9. A distal end of the cutting edge 25 circumferentially partly enters into the groove 11 on the supporting surface 7. The rolling blade 9 rolls on the plate material W supported on the supporting surface 7 to cut the plate material W according to conveyance of the jig body 13.

The paired main holding rollers 15 and 17 are disk-shaped rollers, disposed adjacent to the rolling blade 9 at respective sides in a direction along a rotation axis of the rolling blade 9, and rotatably supported with the jig body 13. The direction along the rotation axis of the rolling blade 9 is also referred to as a "width direction."

According to the first embodiment, the main holding rollers 15 and 17 are coaxial with the rolling blade 9 and each have a smaller diameter than the rolling blade 9. With this configuration, the distal end of the cutting edge 25 protrudes outward from an outer periphery of each main holding roller.

The main holding rollers 15 and 17 are separately pushed by respective springs 27 and 29 as pushing members toward the plate material W relative to the jig body 13. The outer peripheries of the main holding rollers 15 and 17 have flat holding faces 31 and 33. The holding faces 31 and 33 are pressed against the plate material W by pushing force of the springs 27 and 29.

Therefore, the paired main holding rollers 15 and 17 roll on and hold adjoining portions of a cut portion of the plate material W at the respective sides of the rolling blade 9 in the direction along the rotation axis, each adjoining portion, together with the cut portion, on which a stress acts due to the rolling blade 9 cutting the plate material W at the cut portion.

The paired sub holding rollers 19 and 21 are cylindrical rollers and rotatably supported with the jig body 13 in front and rear sides of the rolling blade 9 in a rolling direction of the rolling blade 9, respectively. The rolling direction corresponds to the conveying direction and is also referred to as a "longitudinal direction." The sub holding rollers 19 and 21 are close to the rolling blade 9 in the rolling direction as much as possible unless the sub holding rollers 19 and 21 interfere with the rolling blade 9.

According to the first embodiment, the sub holding rollers 19 and 21 each have a smaller diameter than the main holding rollers 15 and 17 and a lower rotation axis than the rolling blade 9.

Similar to the main holding rollers 15 and 17, the sub holding rollers 19 and 21 are pushed by respective springs 35 and 37 as sub pushing members toward the plate material W relative to the jig body 13. The outer peripheries of the sub holding rollers 19 and 21 have flat holding faces 39 and 41 each extending in the width direction over both sides of the groove 11 of the supporting surface 7 (FIG. 4). According to the first embodiment, the holding face 39 and 41 each extend to overlap both the holding face 31 and 33 of the main holding face 15 and 17 in the longitudinal direction. The holding faces 39 and 41 are pressed against the plate material W by pressing force of the springs 35 and 37, respectively.

Therefore, the sub holding rollers 19 and 21 roll on and hold the plate material W at the front and rear sides of the rolling blade 9 in the rolling direction when cutting the plate material W.

Figure 5:
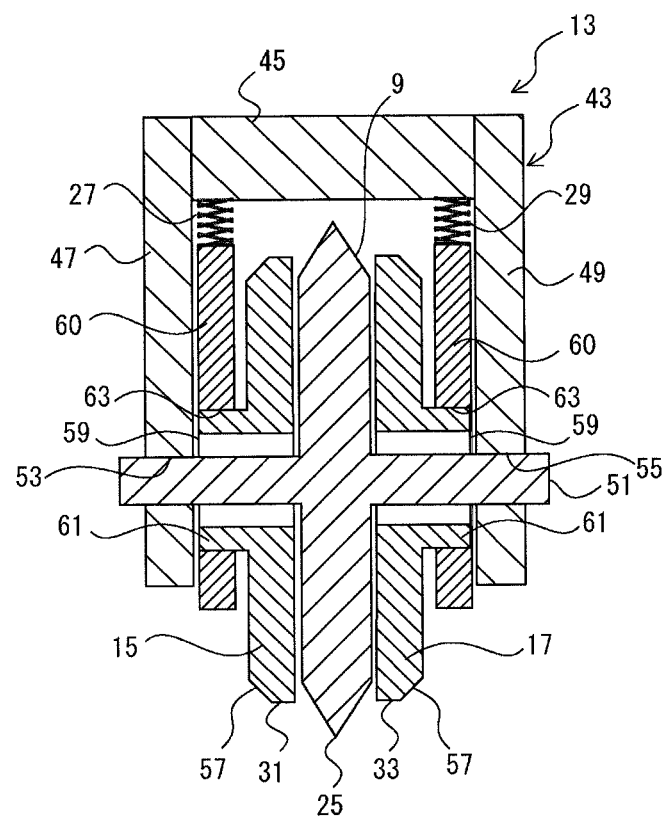
FIG. 5 is a schematic sectional view illustrating a mechanism for supporting the rolling blade and the main holding rollers of the cutting apparatus of FIG. 1.

A mechanism for supporting the rolling blade 9 and the main holding rollers 15 and 17 will be explained in detail with reference to FIG. 5. FIG. 5 is a schematic sectional view illustrating the mechanism.

The jig body 13 has a main support part 43 for the rolling blade 9 and the main holding rollers 15 and 17. The main support part 43 has a U-shaped cross section that opens downward. In particular, the main support part 43 has a base wall 45 and paired support walls 47 and 49 formed at respective ends of the base wall 45 in the width direction. The support walls 47 and 49 extend downward from the base wall 45. The support walls 47 and 49 face each other and support the rolling blade 9 between them.

The rolling blade 9 has rotary shafts 51 on the rotation axis, the rotary shafts 51 protrudes from the respective sides in the direction along the rotation axis. The rotary shafts 51 have distal ends that pass through and are rotatably supported with the respective support walls 47 and 49. With this configuration, the rolling blade 9 is rotatably supported with the jig body 13. The support walls 47 and 49 have bearing holes 53 and 55 that are formed through the support walls 47 and 49. The distal ends of the rotary shafts 51 pass through the bearing holes 53 and 55. Around the rotary shafts 51, the main holding rollers 15 and 17 are loosely fitted, respectively.

The main holding rollers 15 and 17 are symmetric about the rolling blade 9 in the width direction. In the following explanation for the main holding rollers 15 and 17, the one main holding roller 15 will be mostly explained and the other main holding roller 17 will be assigned the same numerals as the main holding roller 15.

Figure 6:
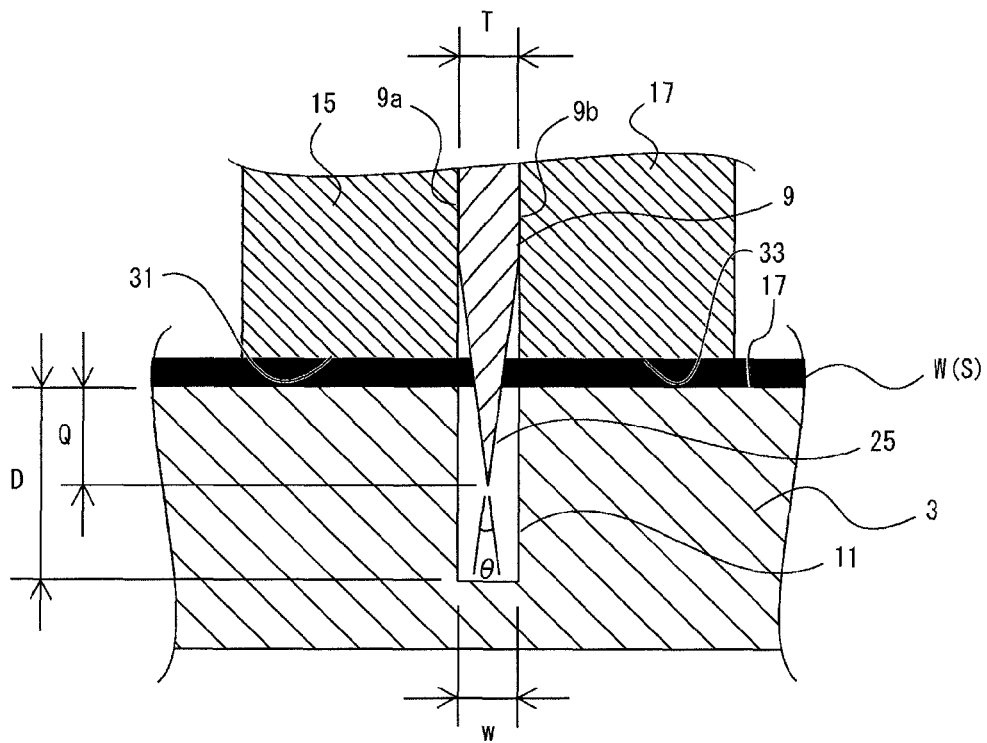
FIG. 6 is a sectional view illustrating a part of the mechanism of FIG. 5 relative to a plate material and a support of the cutting apparatus of FIG. 1.

The main holding roller 15 is disposed adjacent to the rolling blade 9 at the side in the direction along the rotation axis of the rolling blade 9 as mentioned above. With this, the main holding roller 15 is close to the rolling blade 9 in the width direction as much as possible so that the main holding roller 15 holds the adjoining portion of the cut portion on which a stress acts due to the rolling blade 9 cutting the plate material W at the cut portion. According to the first embodiment, the main holding roller 15 is in slidably contact with the rolling blade 9 (FIG. 6). In FIG. 5, there is an expediential slight gap between the main holding roller 15 and the rolling blade 9. There, however, may be the slight gap between the main holding roller 15 and the rolling blade 9 as illustrated in FIG. 5.

The outer periphery of the main holding roller 15 (17) has the holding face 31 (33) as mentioned above. A chamfered part 57 is formed at each corner adjoining the holding face 31 (33).

The inner periphery of the main holding roller 15 has a loosely-fit hole 59 on the rotational axis. The main holding roller 15 is loosely fitted around the rotary shaft 51 through the loosely-fit hole 59 so that the main holding roller 15 is allowed to move up and down, i.e., get closer to and away from the plate material W.

Around the loosely-fit hole 59, a hollow rotary shaft 61 is formed to protrude from a side of the main holding roller 15 opposite to the rolling blade 9. The rotary shaft 61 passes through a shaft support member 60. An end of the rotary shaft 61 is in slidably contact with the support wall 47 (49) around the bearing hole 53 (55). In FIG. 5, however, there is an expediential slight gap between the rotary shaft 61 and the support wall 47 similar to the gap between the main holding roller 15 and the rolling blade 9.

The shaft support member 60 is a plate and is disposed along the support wall 47 (49) of the jig body 13. The shaft support member 60 is supported through the spring 27 (29) with the base wall 45 of the jig body 13 at an upper end so that the spring 27 is vertically interposed between the shaft support member 60 and the jig body 13.

On a lower side of the shaft support member 60, a bearing hole 63 is formed through the shaft support member 60 and rotatably supports the rotary shaft 61 of the main holding roller 15 that is inserted into the bearing hole 63.

The main holding roller 15 (17) according to the first embodiment, therefore, is pushed toward the plate material W by the spring 27 (29) through the shaft support member 60 and the rotary shaft 61.

A relationship among the rolling blade 9, the main holding rollers 15 and 17, the support 3, and the plate material W will be explained with reference to FIG. 6. FIG. 6 is a sectional view illustrating a part of the mechanism of FIG. 5, relative to the plate material W and the support 3. In FIG. 6, the chamfered parts 57 of the main holding rollers 15 and 17 are not illustrated.

The rolling blade 9 has a blade thickness T between the side faces 9a and 9b. The blade thickness T is approximately equal with a groove width W of the groove 11 of the supporting surface 7. According to the first embodiment, the blade thickness T and the groove width W are set to, for example, about 0.3 mm. A groove depth D of the groove 11 is set to, for example, about 1 mm.

An entering length Q of the distal end of the cutting edge 25 that enters into the groove 11 is set in a range of, for example, about 0.3 mm to 0.5 mm. An inclined angle θ of the cutting edge 25 is set to, for example, about 20 degrees.

The main holding rollers 15 and 17 press the plate material W against the supporting surface 7 at respective edges of the groove 11 while slidably contacting with the side faces 9a and 9b of the rolling blade 9. The main holding rollers 15 and 17 according to the first embodiment, therefore, are allowed to hold the adjoining portions of the cut portion on which a stress acts due to the rolling blade 9 cutting the plate material W at the cut portion.

Figure 7:
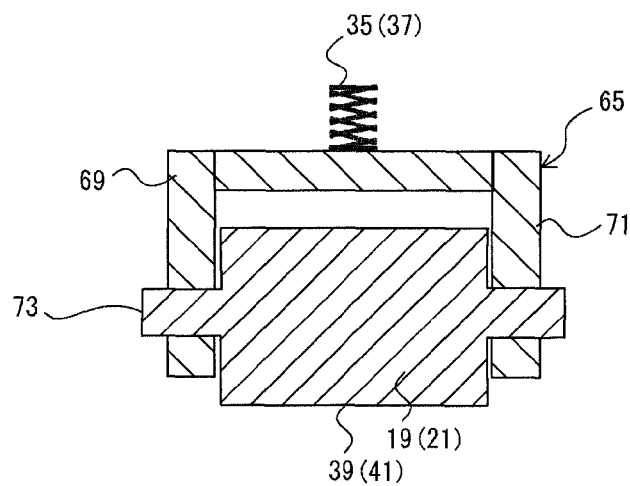
FIG. 7 is a schematic sectional view illustrating a mechanism for supporting the sub-holding roller of the cutting apparatus of FIG. 1.

A mechanism for supporting the sub holding rollers 19 and 21 will be explained in detail with reference to FIG. 7. FIG. 7 is a schematic sectional view illustrating the mechanism. The sub holding rollers 19 and 21 are symmetric about the rolling blade 9 in the rolling direction. In the following explanation for the sub holding rollers 19 and 21, the one sub holding roller 19 will be mostly explained and the other sub holding roller 21 will be assigned the same numerals as the sub holding roller 19.

The jig body 13 has a sub support part 65 for the sub holding roller 19. The sub support part 65 has a U-shaped cross section that opens downward similar to the main support part 43.

Namely, the sub support part 65 has a base wall 67 and paired support walls 69 and 71 formed at respective ends of the base wall 67 in the width direction. The support walls 69 and 71 extend downward from the base wall 45, face each other, and rotatably support the sub holding roller 19 between them. The sub holding roller 19 has rotary shafts 73 that pass through the respective support walls 69 and 71 and are supported with the walls 69 and 71.

The base wall 67 of the sub support part 65 is supported with the jig body 13 through the spring 35. Accordingly, the sub holding roller 19 (21) is pushed toward the plate material W by the spring 35 (37) through the sub support part 65.

An operation of the cutting apparatus 1 will be explained in detail with reference to FIGS. 8-11B.

Figure 8:
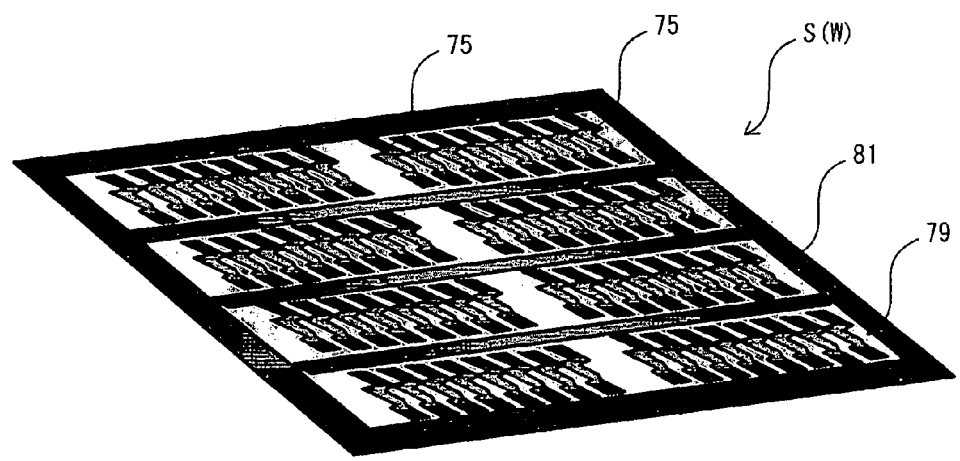
FIG. 8 is a schematic perspective view illustrating a chain sheet in which a plurality of chain products for a flexure of a head suspension are chained together according to the first embodiment of the present invention.
Figure 9:
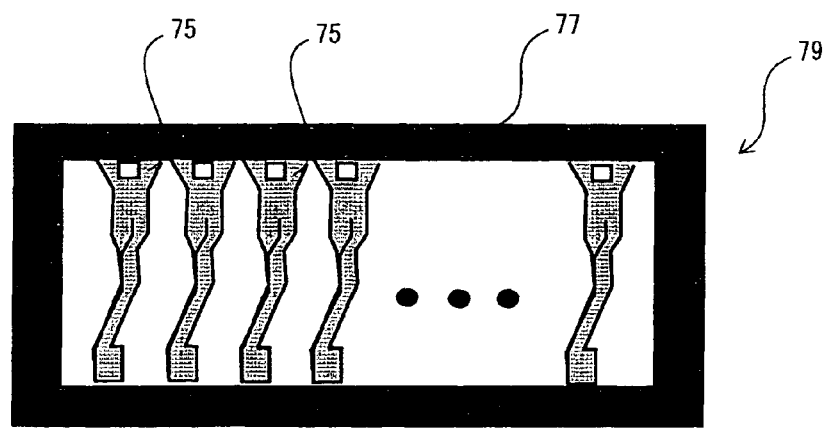
FIG. 9 is a schematic plan view illustrating a chain product in the chain sheet of FIG. 8.

FIG. 8 is a schematic perspective view illustrating a chain sheet S for a flexure 75 of a head suspension and FIG. 9 is a schematic plan view illustrating a chain product 79 in the chain sheet S.

According to the first embodiment, the operation of the cutting apparatus 1 is an example that cuts the individual chain products 79 (FIG. 8) from the chain sheet S as the plate material W (FIG. 9).

The flexure 75 in FIGS. 8 and 9 has a metal layer, an insulating layer, a wiring layer, and a cover insulating layer that are layered in this order (not illustrated). The metal layer is made of, for example, stainless steel having a thickness of about 18 μm, the insulating layer is made of, for example, polyimide having a thickness about 10 μm, the wiring layer is made of, for example, copper having a thickness about 10 μm, and the cover insulating layer is made of, for example, polyimide having a thickness about 3 μm. The thickness of the metal layer, the insulating layer, the wiring layer, and the cover insulating layer may be set in respective ranges of 12-25 μm, 5-20 μm, 4-15 μm, and 0.5-10 μm.

This flexure 75 functions as a part supporting a magnetic head of a head suspension and a part connecting the wiring layer to an amplitude circuit at a base end of a head suspension.

As illustrated in FIG. 9, the flexure 75 is prepared as the chain product 79 when manufacturing a head suspension. The chain product 79 has a rectangular frame 77 and a plurality of the flexures 75 arranged side by side at a predetermined interval in parallel and chained together in the frame 77. As illustrated in FIG. 8, the chain product 79 is prepared as the thin plate-like chain sheet S in advance. The chain sheet S has a chain frame 81 and a plurality of the chain products 79 that are chained together through the chain frame 81 and are aligned in a plurality of lines and columns. The individual chain products 79 are cut from the chain sheet S. For cutting the individual chain products 79 from the chain sheet S, the cutting apparatus 1 according to the first embodiment is used.

Before cutting, the chain sheet S as the plate material W is put on the supporting surface 7 of the support 3 of the cutting apparatus 1 as illustrated in FIGS. 1-3. At this time, an objective portion of the chain sheet S to be cut is positioned over the groove 11. According to the first embodiment, the objective portion is set on the chain frame 81 of the chain sheet S between the adjoining chain products 79.

Figure 10:
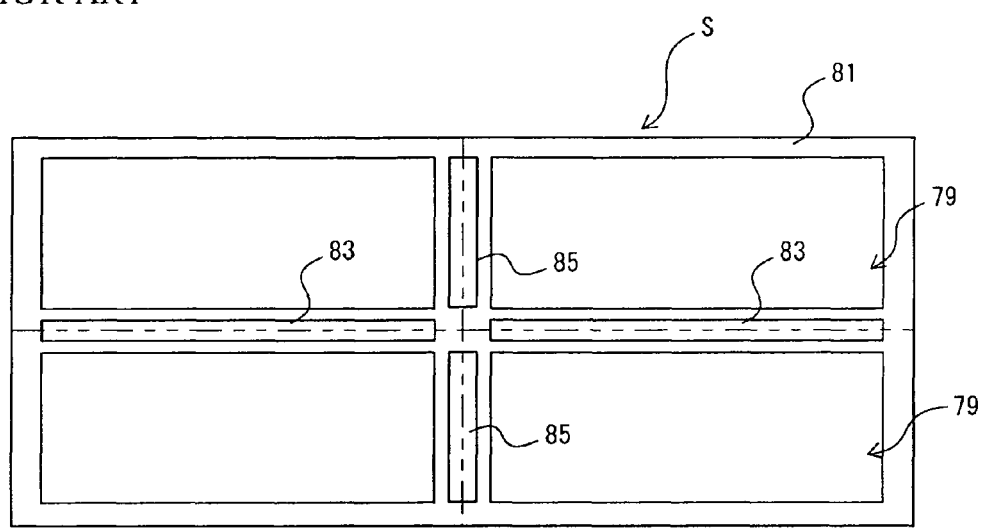
FIG. 10 is a plane view illustrating a chain frame of a chain sheet with objective portions to be cut according to the first embodiment of the present invention.

FIG. 10 is a plane view illustrating objective portions of the chain frame 81 to be cut. In FIG. 10, the flexures 75 are not illustrated.

The chain frame 81 has plural slits 83 and 85 arranged between the chain products 79. The slits 83 in the same lateral line (line) or the slits 85 in the same vertical line (column) are positioned on the groove 11 together with portions aligned with the slits 83 or 85 as an objective portion to be cut as illustrated in FIG. 10 (dotted lines).

Thereafter, the cutting jig 5 is conveyed by the conveyer along the groove 11, for example, in a direction of an arrow A as illustrated in FIG. 1. The rolling blade 9 of the cutting jig 5 rolls on and bites the chain frame 81 of the chain sheet S, thereby cutting or shearing the chain frame 81 as illustrated in FIGS. 1-3.

At the same time, the paired main holding rollers 15 and 17, at respective sides of the rolling blade 9 in the direction along the rotation axis, roll on adjoining portions of a cut portion of the chain frame 81 and holds the adjoining portions with respect to the supporting surface 7 (FIG. 3). The adjoining portions are the portions on which a stress acts due to the rolling blade 9 cutting the chain frame 81 at the cut portion. Therefore, the chain frame 81 is prevented from bending. The bending may be caused by a cutting jig having no main holding rollers and be deformation or inflection on adjoining portions at both sides of a cut portion of a chain frame 81.

The main holding rollers 15 and 17 press the chain frame 81 against the supporting surface 7 by pushing force of the springs 27 and 29, to accurately hold the chain frame 81. Further, the main holding rollers 15 and 17 are separately pushed by the respective springs 27 and 29, to absorb a difference in level that may be cased on the chain frame 81 between both sides of the cut portion. In particular, this configuration is effective against the chain frame 81 for the flexure 75. The chain frame 81 for the flexure 75 is likely to cause such a difference in level because the chain frame 81 partly has a layer structure that is the same as the layer structure of the flexure 75.

As well as the main holding rollers 15 and 17, the paired sub holding rollers 19 and 21, at respective sides of the rolling blade 9 in the rolling direction, roll on the chain frame 81 and hold the chain frame 81 with respect to the supporting surface 7. This prevents the chain frame 81 from warpage in the rolling direction. The warpage may be caused by a cutting jig having no sub holding rollers and be deformation or inflection of the chain sheet S in the rolling direction centering on the rolling blade 9.

The sub holding rollers 19 and 21 are pushed toward the chain frame 81 by the springs 27 and 29, to accurately hold the chain frame 81.

In this way, the cutting apparatus 1 is capable of cutting the individual chain products 79 from the chain sheet S without deformation.

Figure 11A:
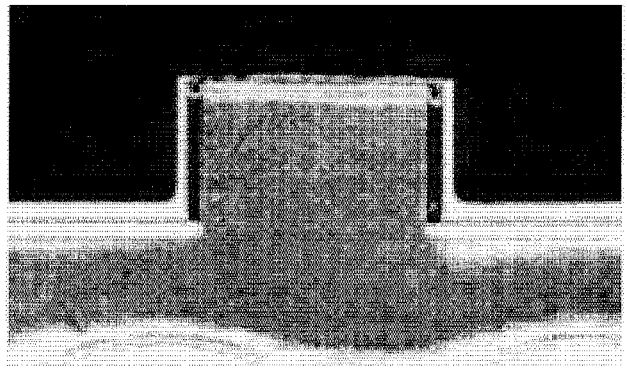
FIGS. 11A and 11B are photographed images illustrating cut portions according to the first embodiment and a comparative example, respectively.
Figure 11B:
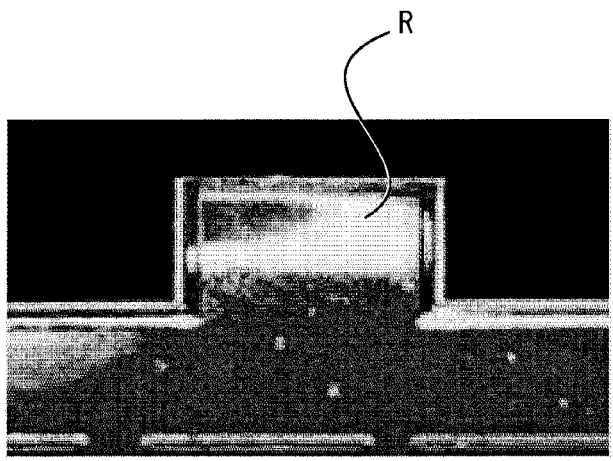

FIGS. 11A and 11B are photographed images illustrating a cut portion and an adjoining portion according to the first embodiment and a comparative example. The comparative example uses a cutting jig having a rolling blade 9 without main and sub holding rollers.

As illustrated in FIG. 11A, the cut portion and the adjoining portion of the first embodiment have no deformation and keep flat so as not to cause diffuse reflection. As illustrated in FIG. 11B, the cut portion and the adjoining portion of the comparative example is confirmed that diffuse reflection R is caused by deformation.

The cutting apparatus 1 according to the first embodiment is applied to the cutting of the chain product 79 for the flexure 75 that is a part of a head suspension as mentioned above. The cutting apparatus 1 is applicable to cutting of the other chain product for a load beam, a base plate or the like of a part of a head suspension. The cutting apparatus 1 is also applicable to cutting of a thin plate other than parts of a head suspension.

Effects of the first embodiment of the present invention will be explained.

The cutting jig 5 according to the first embodiment cuts the chain frame 81 of the chain sheet S (plate material W) for a part of a head suspension positioned on the supporting surface 7. The cutting jig 5 includes a jig body 13, a rolling blade 9 rotatably supported with the jig body 13 to roll on and cut the chain frame 81 of the chain sheet S, and the paired main holding rollers 15 and 17 rotatably supported with the jig body 13 at the respective sides of the rolling blade 9 in the direction along the rotation axis of the rolling blade 9. The main holding rollers 15 and 17 roll on and hold the adjoining portions of the cut portion of the chain frame 81, each adjoining portion on which a stress acts due to the rolling blade 9 cutting the chain frame 81 at the cut portion.

According to the first embodiment, the rolling blade 9 cuts the chain frame 81 while the portions on which the stress acts due to the rolling blade 9 are held by the main holding rollers 15 and 17 with respect to the supporting surface 7 at the both sides of the rolling blade 9 in the direction along the rotation axis.

This allows the chain frame 81 to be cut without deformation or bending with no use of a special die. Namely, the cutting jig 5 cuts the chain product 79 from the chain sheet S without deformation to realize a precision head suspension.

The cutting jig 5 is applicable to not only low-volume manufacturing but also high-volume manufacturing in order to realize a precision head suspension.

The main holding rollers 15 and 17 are coaxial with the rolling blade 9 and each have a smaller diameter than the rolling blade 9. This allows the main holding rollers 15 and 17 to hold the chain frame 81 at the both sides of the rolling blade 9 in the direction along the rotation axis of the rolling blade 9 while accurately cutting the chain frame 81.

According to the first embodiment, the rolling blade 9 has the rotary shafts 51 protruding from the respective sides in the direction along the rotation axis and the main holding rollers 15 and 17 are loosely fitted around the respective rotary shafts 51.

This configuration prevents the cutting jig 5 from increasing in size and allows the cutting jig 5 to be applied to small objective portions to be cut. Namely, the cutting jig 5 is applied to parts for a head suspension that are minute products.

According to the first embodiment, the main holding rollers 15 and 17 loosely fitted around the rotary shafts 51 are pushed toward the chain frame 81 by the springs 27 and 29, to accurately hold the chain frame 81 with the pressing force.

Further, the main holding rollers 15 and 17 are separately pushed by respective springs 27 and 29. Accordingly, even if a difference in level is caused on the chain frame 81 between both sides of a cut portion, the difference in level is absorbed to more accurately hold the chain frame 81.

The sub holding roller 19 or is disposed in at least one side of the rolling blade 9 in the rolling direction and rotatably supported with the jig body 13 to roll on the chain frame 81 and hold the chain frame 81 with respect to the supporting surface 7.

Accordingly, the cutting jig 5 also prevents deformation or warpage of the chain sheet S, thereby realizing a more precision head suspension.

The sub holding rollers 19 and 21 are disposed in the respective side of the rolling blade 9 in the rolling direction, thereby further preventing the deformation or warpage of the chain sheet S.

The sub holding rollers 19 and 21 are pushed toward the chain frame 81 or chain sheet S by the springs 35 and 37, to accurately hold the chain frame 81 with the pressing force.

The cutting apparatus 1 with the cutting jig 5 has the support 3 including the supporting surface 7 on which the chain sheet S is positioned and the groove 11 that is formed on the supporting surface 7 and avoids the rolling blade 9 of the cutting jig 5 to cut the chain frame 81. The main holding rollers 15 and 17 of the cutting jig 5 hold the adjoining portions of the cut portion of the chain frame 81 against the supporting surface 7 at respective edges of the groove 11.

Accordingly, the cutting apparatus 1 more accurately holds the portions of the chain frame 81 on which the stress acts due to the rolling blade 9.

In the cutting apparatus 1, the rolling blade 9 has the blade thickness T equal with the groove width W of the groove 11, to more accurately hold the portions of the chain frame 81 on which the stress acts due to the rolling blade 9.

The groove 11 may have a groove width W larger or smaller than a blade thickness T of the rolling blade 9. If the groove width W is larger than the blade thickness T, the groove width W is preferably set within a range capable of preventing the bending of the chain frame 81 that is likely to be caused as the groove width W becomes larger. If the groove width W is smaller than the blade thickness T, it is preferable to precisely control the shape of the cutting edge 25 of the rolling blade 9 such as the entering length Q and the inclined angle θ.

The cutting jig 5 is supported above the support 3 so as to be conveyed along the groove 11, so that the cutting apparatus 1 only has to convey the cutting jig 5 to easily and accurately cut the chain frame 81 of the chain sheet S positioned on the supporting surface 7.

Modifications according to the first embodiment will be explained with reference to FIGS. 12-13.

Figure 12:
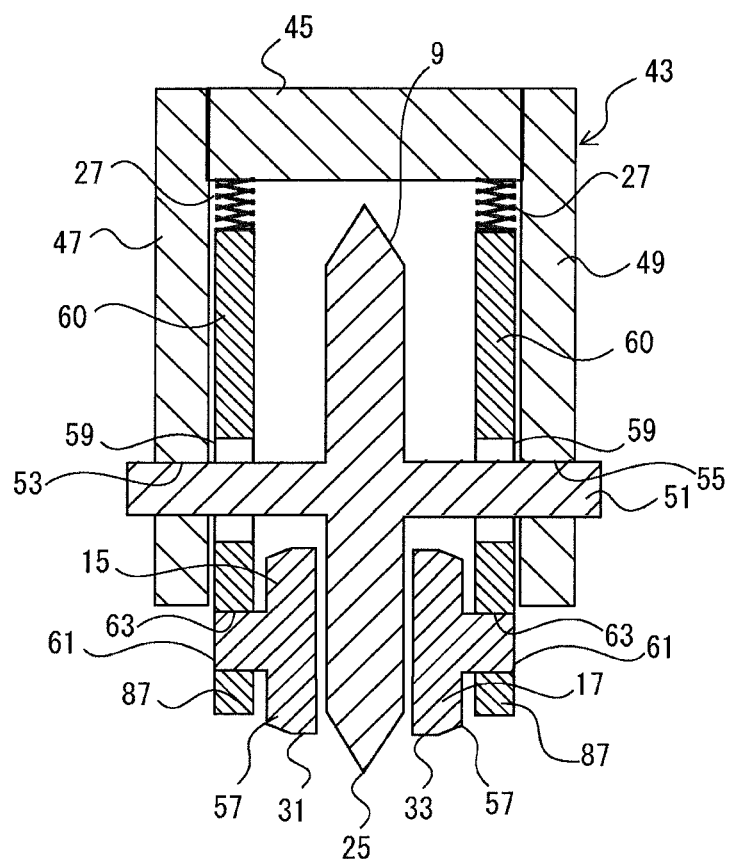
FIG. 12 is a schematic sectional view illustrating a mechanism for supporting a rolling blade and main holding rollers of a cutting apparatus according to a modification of the first embodiment.

FIG. 12 is a schematic side view illustrating a mechanism for supporting a rolling blade 9 and main holding rollers 15 and 17 according to a modification.

The modification positions a rotation axis of the main holding rollers 15 and 17 below a rotation axis of the rolling blade 9. Namely, shaft support members 60 of a main support part 43 each have an extension 87 at a lower end, the extension 87 extending downward. A rotary shaft 61 of the main holding roller 15 (17) passes through the corresponding extension 87. The main holding roller 15 (17) has a small diameter that is set according to the position of the rotation axis thereof.

Figure 13:
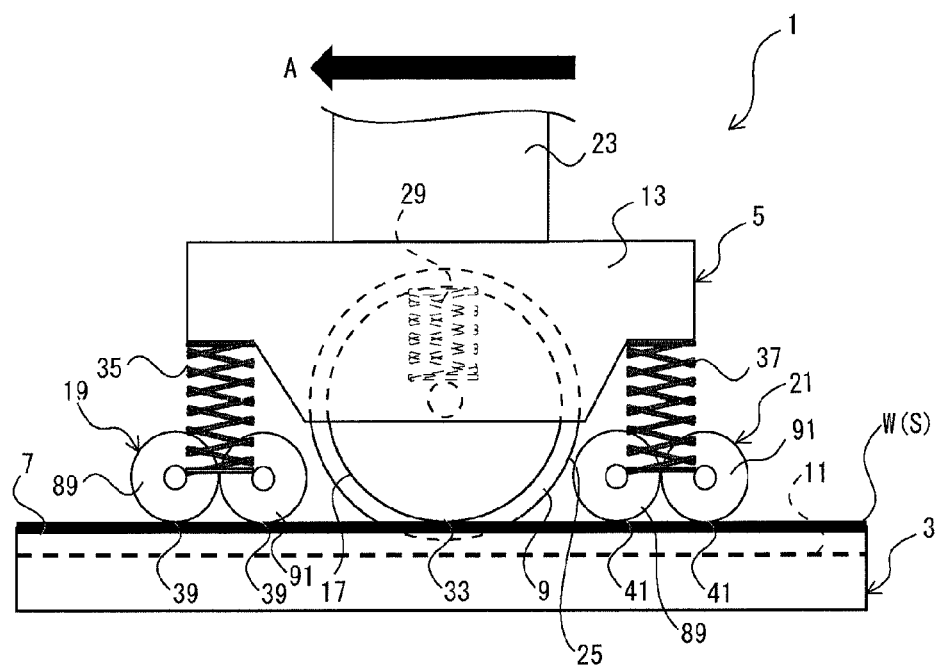
FIG. 13 is a schematic side view illustrating a main part of a cutting apparatus according to an another modification of the first embodiment.

FIG. 13 is a schematic side view illustrating a main part of a cutting apparatus 1 with a cutting jig 5 according to an another modification.

The cutting jig 5 of FIG. 13 has sub holding rollers 19 and 21 each including paired roller elements 89 and 91.

These modifications provide the effects that are the same as those of the first embodiment.

Figure 14:
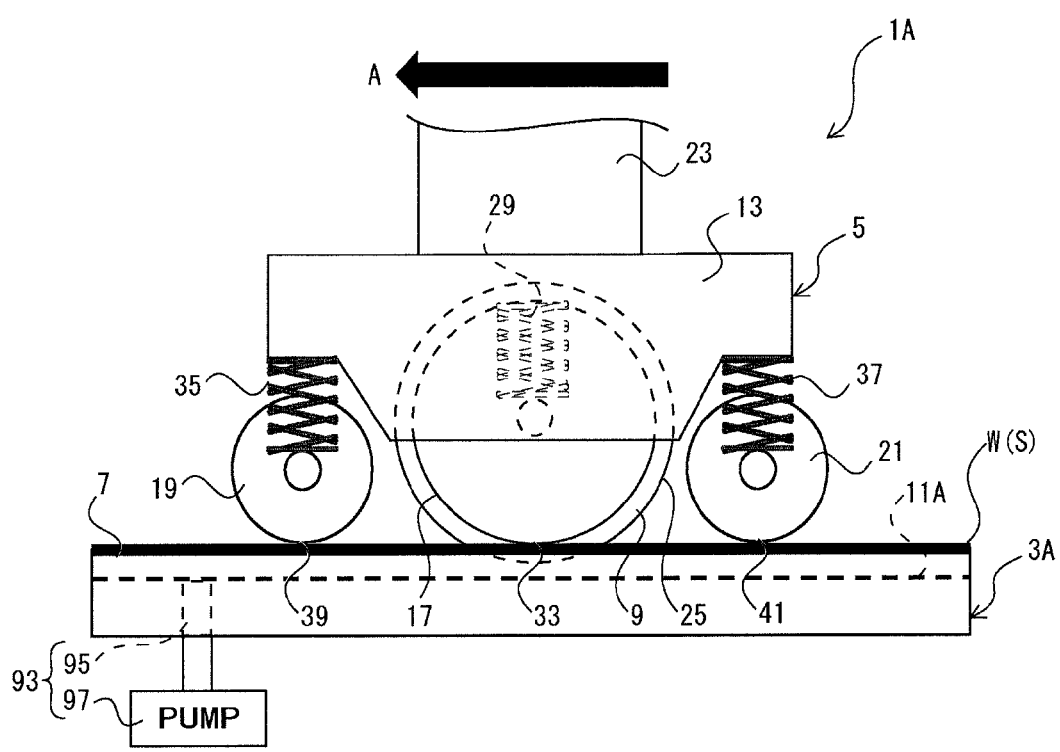
FIG. 14 is a schematic side view illustrating a main part of a cutting apparatus according to a second embodiment of the present invention.

A second embodiment of the present invention will be explained in detail with reference to FIG. 14 which is a schematic side view illustrating a cutting apparatus 1A. The second embodiment has a basic structure similar to that of the first embodiment, and therefore, parts of FIG. 14 corresponding to those of the first embodiment of FIG. 1 are represented with the same reference numerals or the same reference numerals plus "D" to omit reduplicated explanation.

The cutting apparatus 1A according to the second embodiment adds a suction unit 93 applying negative pressure in a groove 11A of a support 3A to the first embodiment.

The suction unit 93 has a suction hole 95 and a pump 97. The suction hole 95 is formed through the support 3A so that the groove 11A communicates with the outside at the back of the support 3A. To the suction hole 95, the pump 97 is connected.

The pump 97 sucks through the suction hole 95 to apply negative pressure in the groove 11A, so that the plate material W is drawn onto the supporting surface 7.

According to the second embodiment, the cutting apparatus 1A accurately supports the plate material W without positional shift. In addition, the cutting apparatus 1A provides the effects that are the same as those of the first embodiment.

The present invention is not limited to the embodiments.

The cutting jig 5 may not be applied to the cutting apparatus 1 and may be manually handled by a worker.

The paired main holding rollers 15 and 17 may be pushed by a single spring instead of the springs 27 and 29. In this case, for example, the main support 43 is separately from the jig body 13 and supported with the jig body 13 through the single spring.

One of the sub holding rollers 19 and 21 may be omitted.

As pushing members, other elastic or resilient members such as rubber may be used instead of springs 27, 29, 35 and 37.

What is claimed is:

1. A cutting jig for cutting a plate material positioned on a supporting surface, comprising:
    a jig body;
    a rolling blade rotatably supported with the jig body to roll on and cut the plate material; and
    paired holding parts rotatably supported with the jig body at respective sides of the rolling blade in a direction along a rotation axis of the rolling blade to roll on and hold adjoining portions of a cut portion of the plate material, each adjoining portion of the cut portion on which a stress acts due to the rolling blade cutting the plate material at the cut portion; and
    wherein the rolling blade has rotary shafts protruding from the respective sides in the direction along the rotation axis, and the paired holding parts are loosely fitted around the respective rotary shafts.

2. The cutting jig of claim 1, further comprising:
    at least one pushing member that pushes the paired holding parts toward the plate material.

3. The cutting jig of claim 2, wherein paired pushing members are provided to press the paired holding parts, respectively.

4. The cutting jig of claim 1, wherein the paired holding parts are coaxial with the rolling blade and each have a smaller diameter than the rolling blade.

5. The cutting jig of claim 1, further comprising:
    a sub holding part disposed in at least one side of the rolling blade in a rolling direction of the rolling blade and rotatably supported with the jig body to roll on and hold the plate material.

6. The cutting jig of claim 5, wherein the sub holding part disposed in each side of the rolling blade in the rolling direction.

7. The cutting jig of claim 5, further comprising:
a sub pushing member that pushes the sub holding part toward the plate material.

8. A cutting apparatus having the cutting jig of claim 1, comprising:
a support including a supporting surface on which a plate material is positioned and a groove that is formed on the supporting surface and avoids the rolling blade of the cutting jig to cut the plate material, wherein the paired holding parts of the cutting jig hold the adjoining portions of the cut portion of the plate material with respect to the supporting surface at respective edges of the groove.

9. The cutting apparatus of claim 8, wherein the rolling blade has a blade thickness equal with a groove width of the groove.

10. The cutting apparatus of claim 8, wherein the cutting jig is supported above the support so as to be conveyed along the groove.

11. The cutting apparatus of claim 8, further comprising:
a suction unit applying negative pressure in the groove to draw the plate material onto the supporting surface.

12. A cutting jig for cutting a plate material positioned on a supporting surface, comprising:
a jig body;
a rolling blade rotatably supported with the jig body to roll on and cut the plate material;
paired holding parts rotatably supported with the jig body at respective sides of the rolling blade in a direction along a rotation axis of the rolling blade to roll on and hold adjoining portions of a cut portion of the plate material, each adjoining portion of the cut portion on which a stress acts due to the rolling blade cutting the plate material at the cut portion;
rotary shafts protruding from the respective sides in the direction along the rotation axis; and
shaft support members loosely fitted around the respective rotary shafts and supporting the respective paired holding parts so that a rotation axis of the paired holding parts are positioned below the rotation axis of the rolling blade.

* * * * *